United States Patent
Schug et al.

(10) Patent No.: US 7,178,957 B2
(45) Date of Patent: Feb. 20, 2007

(54) MULTIPLE-FILAMENT MOTOR VEHICLE HEADLIGHT LAMP

(75) Inventors: Josef Andreas Schug, Wuerselen (DE); Helmut Tiesler-Wittig, Tokyo (JP); Ingolf Sischka, Plauen (DE)

(73) Assignee: Koninklijke Philips Electronics, N.V., Eindhoven (NL)

(*) Notice: Subject to any disclaimer, the term of this patent is extended or adjusted under 35 U.S.C. 154(b) by 18 days.

(21) Appl. No.: 10/480,656

(22) PCT Filed: Jun. 28, 2002

(86) PCT No.: PCT/IB02/02468

§ 371 (c)(1),
(2), (4) Date: Dec. 12, 2003

(87) PCT Pub. No.: WO03/003410

PCT Pub. Date: Jan. 9, 2003

(65) Prior Publication Data

US 2004/0170028 A1 Sep. 2, 2004

(30) Foreign Application Priority Data

Jun. 29, 2001 (DE) .................................. 101 31 444

(51) Int. Cl.
*F21S 8/10* (2006.01)

(52) U.S. Cl. ...................................... 362/507; 362/539
(58) Field of Classification Search ................ 362/507, 362/518, 539, 543, 544, 214, 248, 299
See application file for complete search history.

(56) References Cited

U.S. PATENT DOCUMENTS

| | | | | |
|---|---|---|---|---|
| 4,638,408 A | * | 1/1987 | Wetherington | ............... 362/544 |
| 5,055,981 A | * | 10/1991 | Nino | ........................... 362/539 |
| 5,215,368 A | * | 6/1993 | Neumann | .................... 362/518 |
| 5,954,428 A | | 9/1999 | Eichhorn et al. | ........... 362/543 |
| 2002/0039289 A1 | * | 4/2002 | Kinouchi | .................... 362/214 |

FOREIGN PATENT DOCUMENTS

| | | |
|---|---|---|
| DE | 19805216 | 8/1998 |
| DE | 19906580 | 8/1999 |

\* cited by examiner

*Primary Examiner*—Sandra O'Shea
*Assistant Examiner*—Sharon Payne

(57) ABSTRACT

The invention relates to a headlight for a motor vehicle, to a lamp for the headlight, and to a headlight unit. The lamp has two coils and is capable of fulfilling widely differing functions. Means for screening off the light emitted by the coils in certain angular regions are arranged such that the regions illuminated by the coils overlap only slightly, preferably not at all. At least two reflector regions of the lamp are each illuminated by an associated coil, and are shaped such that one headlight emits two headlight beams, both having a substantially horizontal bright/dark cutoff.

11 Claims, 6 Drawing Sheets

MULTIPLE-FILAMENT MOTOR VEHICLE HEADLIGHT LAMP

The invention relates to a lamp for a motor vehicle headlight, a headlight for a motor vehicle, and a headlight unit.

Motor vehicle headlights with a reflector and at least one lamp inserted into the reflector are used for lighting motor vehicles. Lamps used are on the one hand incandescent lamps and on the other hand discharge lamps. Complete headlight units with several reflectors are often used, which are incorporated into motor vehicles as complete units, often with a common housing and a common cover.

A number of lighting functions are realized by means of these headlights, lamps, and headlight units. Usual lighting functions are low beam, high beam, and fog beam. These lighting functions are specified so as to comply with various requirements and are standardized in law. The low beam, for example, distributes a major portion of the light asymmetrically over the road so as to render the road as visible as possible for the driver. At the same time, limit values are given for dazzling of the oncoming traffic. A sharp, approximately horizontal bright/dark cut-off is required. The fog beam is a symmetrical light distribution which requires a bright/dark cut-off lying at a lower level. In contrast to the former, the low beam has no bright/dark cut-off. The light distribution is symmetrical here with its maximum on the optical axis.

In addition to the classical lighting functions, work is being done at the moment aimed at laying down exact specifications for new lighting functions. These discussions relate to what is denoted AFS (Advanced Frontlighting Systems) and should render it possible to specify optimally adapted light distributions for various viewing conditions. The light distributions used until now have proved unsatisfactory in practice in the sense that they safeguard a good illumination for certain driving conditions only. Thus, for example, a correctly aligned low beam headlight will strongly dazzle the oncoming traffic on wet roads. The conventional low beam is not sufficient during driving on highways for lighting the road over that distance which is required for safety at higher speeds.

A daylight driving beam as an AFS lighting function serves to render a vehicle better visible at its front. The light distribution is symmetrical, approximately 2×20° wide and 2×10° high, and has low maximum intensities such that it is indeed observed by oncoming traffic but will not dazzle the latter. The daylight driving beam has no bright/dark cut-off. The light distribution is described in ECE R87.

A further AFS lighting function is the bad weather beam. This serves to provide a better view for motor vehicle drivers in bad weather conditions, in particular in rain. Higher intensities are to compensate for the strong reflection losses on the wet road surface, so that the driver has an unimpaired, or even improved view. At the same time, the increased dazzling effect for the oncoming traffic caused by the wet road surface is to be reduced in that the intensity of the headlight is reduced in those ranges of the headlight light distribution which cause dazzling of the oncoming traffic. These ranges are (in the case of right-hand traffic) on the left-hand side of the driving lane at approximately 10 to 50 m distance in front of the vehicle. A light distribution with a sharp bright/dark cut-off is accordingly necessary.

The lighting function denoted city light serves to a correct lighting in built-up areas, which are often fitted with permanent lighting (street lamps). Low intensities as compared with the normal low beam are required here, because the basic illumination over large surface areas of the road is already assured. At the same time, the dazzling risk for the oncoming traffic may be minimized and more light may be used for a wide headlight beam. A wider beam offers the advantage, in particular in built-up areas, that vehicles when approached at right angles (for example, from a side street) can be better observed. A horizontal bright/dark cut-off is present in the city light.

The highway beam serves to provide an improved distance visibility for the driver of the vehicle. The headlight beam may be designed to be narrower than in the conventional low beam for this purpose, a wide dimensioning being unnecessary on highways because there are no sharp corners here. The risk of dazzling of the oncoming traffic also relates to other regions of the headlight distribution because of the divided highway system, so that higher dazzling values can be allowed. A slight raising of the bright/dark cut-off and higher intensities in the maximum combined with a smaller beam width correspond to the present views of a highway beam.

The road bend beam serves to provide a better illumination of (possibly sharp) corners, in particular on country roads. The beam width is increased in the direction of the expected bend for this purpose, or the entire headlight beam is rotated somewhat to the right or the left so as to illuminate the bend curve better. The light distribution again has a horizontal bright/dark cut-off in the case of the road bend beam.

The traffic sign beam serves to improve the safety provided by traffic signs provided above the street level. The corresponding light distribution is limited to a narrow region above the horizontal, so that here again a bright/dark cut-off is present, indeed to the extent that only minimum light intensities are allowed below the cut-off.

A further lighting function is the position light. It serves to indicate and render visible the front contour of the vehicle. A light distribution without bright/dark cut-off is used for this. The intensity is very low.

Various shapes of headlights, lamps, and headlight units for vehicles are known from the prior art. Thus U.S. Pat. No. 5,954,428 shows a headlight which combines three lighting functions (low beam, fog beam, and high beam) in one reflector. For this purpose, the headlight comprises two lamps, of which a single-filament lamp is associated with an upper reflector region and a dual-filament lamp is associated with a central and lower reflector region. The single-filament lamp and the filaments of the dual-filament lamp each irradiate the associated reflector regions so as to achieve the respective desired lighting functions.

Usual headlights are nowadays the so-termed DFCS headlights (Double Filament Complex Shape). Thus DE-A-19906580 describes a headlight which is capable of performing two different lighting functions with one dual-filament lamp and one reflector, such that one lighting function has a bright/dark cut-off and the other lighting function has no bright/dark cut-off, for example fog beam and high beam, or low beam and high beam. A screen cuts off one of the filaments in an angular region. The reflector comprises respective regions which each cooperate with one of the filaments, such that one of the regions is irradiated only by one filament (i.e. the filament which is not shielded). A method of constructing the reflector as to its shape is indicated, such that a suitable superimposition of the images of the filaments creates a bright/dark cut-off. Such reflector geometries are denoted "Complex Shape" or "Independent Surface", in contrast to pure parabolic reflectors.

U.S. Pat. No. 5,215,368 also shows an automobile headlight with a lamp having two filaments. The reflector is subdivided into four sectors. The bright/dark cut-off for the low beam is created through a suitable superimposition of images of the filaments.

DE-A-19805216 discloses a headlight with a dual-filament lamp for generating a light beam with a bright/dark cut-off and a light beam without bright/dark cut-off. The reflector is subdivided into two segments again, such that the first filament shaded by a screen cap in a defined radiant angle range illuminates a first segment so as to generate a low beam with a bright/dark cut-off. The second filament is not screened and illuminates the entire reflector, generating a driving beam without bright/dark cut-off by means of a segment of the reflector specially designed for this.

Two filaments are present in the motor vehicle lamp of WO-A-98/49716. To minimize dazzling caused by that light which is radiated by the primary filament and reflected at the secondary filament, strips are provided on the glass bulb of the lamp, which strips absorb part of the light.

Two examples of headlight units are described in DE-A-4238274 and U.S. Pat. No. 5,975,730. U.S. Pat No. 5,975,730 describes a headlight unit with several reflectors and incandescent lamps arranged in the reflectors. DE-A-4238274 describes a headlight unit with two reflectors and incandescent lamps positioned in the reflectors. One of the incandescent lamps has two filaments, different reflector regions being associated with the individual filaments so that a light beam is radiated when the respective region is illuminated by the associated filament.

EP-A-0791779 discloses a headlight with a reflector and a dual-filament incandescent lamp. The reflector is subdivided into two regions, of which one is associated with the main filament and the other with the auxiliary filament. A shading screen here ensures that the main filament only illuminates the associated segment, whereas the auxiliary filament illuminates both segments. It is indicated that the bright/dark cut-off is generated not through imaging of the edges of the screen cap, but by reflector segments constructed as independent surfaces. It is noted that this construction is suitable for AFS lighting functions because it renders it possible to offer a plurality of different functions and still to keep the number of headlights required for this small.

It is an object of the invention to provide a motor vehicle headlight, a lamp for this, as well as a headlight unit, by means of which mutually widely differing lighting functions can be realized.

This object is achieved by means of a lamp as claimed in claim 1, a headlight as claimed in claim 5, and headlight units as claimed in claims 7 and 8. Dependent claims relate to advantageous embodiments of the invention.

The lamp according to the invention has two coils which can be operated separately from one another, similar to known dual-filament incandescent lamps. In addition, means for cutting off the emitted light are present, i.e. for example strips, plates, etc., so that the light emitted by the coils is blocked out in certain angular regions. In contrast to known lamps, however, the invention provides that only a very small overlap is present between the region illuminated by the first coil and the region illuminated by the second coil. In contrast to known lamps (for example known "H4" lamps), in which at least one coil ("main coil") always illuminates practically the entire reflector, a headlight comprising a "doubly cut-off" dual-filament lamp is capable of realizing various lighting functions in a much more flexible way.

The overlap should be small here, preferably the solid angle region in which both light beams radiate should not be more than 20% of the entire region. This relates in particular to regions in those directions which are relevant for the use of the lamp in a reflector. In the conical solid angle region around the lamp cap (up to approximately 15° with respect to the optical axis) which is rotationally symmetrical with respect to the optical axis and also in the conical region in the direction of the tip of the lamp (up to approximately 30° with respect to the optical axis), an overlap of said regions, i.e. an illumination by both coils, is not disadvantageous. These two regions are not or scarcely relevant for the use of the lamp in a reflector. In the remaining solid angle region relevant for the use in a reflector, however, a very small overlap of less than 10% is preferred, and particular preference is given to a total absence of an overlap in this region.

Suitable segments of reflectors can be defined such that they are illuminated substantially exclusively by the associated coils because the two coils, which can be operated separately from one another, illuminate regions which have no or only a very slight overlap. An overlap as small as possible is to be aimed for because illumination by the other coil is undesirable in most cases and may contribute to effects such as dazzling.

The screening or cutting-off means may be of various constructions. There may be one or several screening bodies, for example cup-shaped metal parts. Other means known to those skilled in the art are also possible, such as strips, caps, etc.

A headlight according to the invention with at least one lamp having two or more coils comprises a reflector with at least two regions. One region is associated with the first coil and a further region with the second coil, while the reflector regions are each illuminated only by the associated coil (possibly with the exception of a small overlap region). Such a headlight can be designed for several lighting functions in a very flexible manner because an interfering mutual influence of the lighting functions is excluded to a high degree.

One headlight beam may thus have a bright/dark cut-off, whereas the other beam has no bright/dark cut-off. The bright/dark cut-off may be achieved through imaging of the screening member, but preferably a reflector with separate surfaces is used, which is constructed such that the bright/dark cut-off is generated through superimposition of the images of the coils.

Most importantly, however, it is possible to generate two headlight beams which each have a bright/dark cut-off by means of a "doubly screened" lamp. This cannot be normally achieved with conventional H4 lamps because the illumination of a reflector segment associated with a first coil by the second coil often leads to light components which render a sharp bright/dark cut-off impossible.

The headlight unit as defined in claim 7 comprises at least two of the headlights described. An arrangement in a common housing with a common cover is preferred. When the doubly screened lamps according to the invention are used in a headlight unit with several reflectors, a large number of lighting functions can be combined. It is even possible in this case to combine two functions which both require a bright/dark cut-off in one headlight. As a result, combinations of a plurality of the lighting functions described above, in particular also the AFS lighting functions, most of which require a bright/dark cut-off, can be provided by a headlight unit with a small number of headlights.

The headlight unit of claim 8 comprises two reflectors and incandescent lamps arranged in the respective reflectors. Each of the incandescent lamps has at least two coils, while the reflectors are also each subdivided into two regions. According to the invention—depending on the operation of the coils of the incandescent lamps present in the headlights, each of the reflectors may emit a first light beam with a horizontal bright/dark cut-off and a second light beam without such a horizontal bright/dark cut-off.

Thus four different lighting functions can be fulfilled already by a headlight unit with only two reflectors. Conventional dual-coil incandescent lamps with simple screenings may be used for this (for example, so-called H4 lamps). Two lighting functions may then be combined in each of the reflectors, one with a bright/dark cut-off and one without such a bright/dark cut-off. Lighting functions with an approximately horizontal bright/dark cut-off may be the low beam, bad weather beam, city light, highway beam, road bend beam, or fog beam. Light beams without such a horizontal bright/dark cut-off may be the main driving beam, daylight driving beam, or position light in accordance with the AFS lighting functions mentioned above. Any combinations desired may be made of these functions, depending on the required application.

An embodiment of the invention will now be explained in more detail below with reference to drawings, in which.

Figure 1:
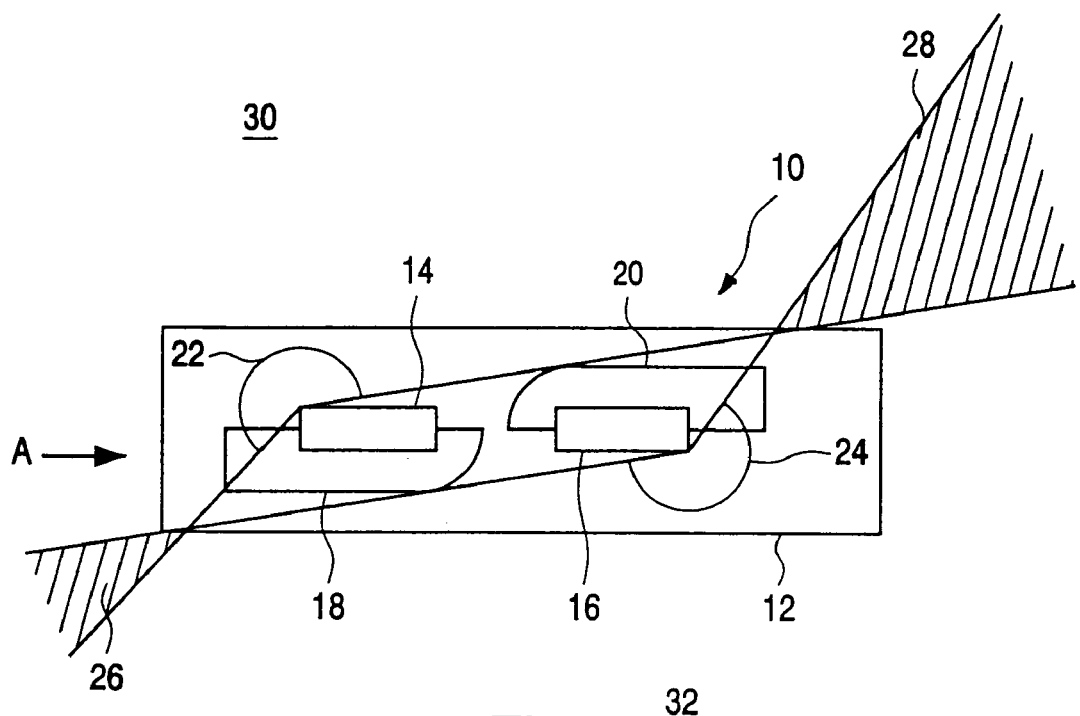
FIG. 1 is a longitudinal sectional view of the glass bulb of a first embodiment of a lamp.

FIG. 1 shows a first embodiment of a lamp in longitudinal sectional view. The lamp is a halogen incandescent lamp 10 with a glass bulb 12 in which a first coil 14 and a second coil 16 are located. The incandescent lamp 10, of which the bulb and the elements arranged therein are indicated diagrammatically only in FIG. 1, has a lamp cap (not shown) at one end for mechanical retention of the lamp in a headlight and for its electrical connection. The coils 14, 16 each have a number of turns close together, thus creating the elongate bodies shown in FIG. 1. At the ends of these regions of turns indicated with rectangles in FIG. 1, there are electrical supply lines (not shown) extending from the cap of the incandescent lamp 10 to the coils. The coils and the further elements of the lamp are suspended from said supply lines inside the incandescent lamp without touching the glass bulb 12.

The incandescent lamp 10 further comprises a first screening plate 18 and a second screening plate 20. The first screening plate 18 is associated with the first coil 14, and the second screening plate 20 with the second coil 16. The screening plates 18, 20 are positioned immediately next to the associated coils 14, 16, but without making contact with the latter. They are shaped such that a curvature is provided at least at one end of each plate 18, 20, so that a kind of tub is formed in which the respective associated coil 14, 16 is partly enclosed. As the elevation of FIG. 2 viewed along the optical axis shows, the plates 18, 20 are not straight in transverse direction either, but are curved at a distance from the coils 14, 16 around the latter as well.

The coils 14, 16 can be electrically operated separately from one another. When connected to a suitable current supply, the coils will glow and radiate light, initially in all directions. The screening plates 18, 20 belonging to the coils 14, 16 cut off the light issuing from the coils 14, 16 in certain (solid) angular regions. Thus the first coil 14 only illuminates the angular region defined by the angle 22 in the plane of cross-section shown in FIG. 1 and the upper region of the plane of cross-section shown in FIG. 2, while the second coil 16 illuminates only the angular region defined by the angle 24 in FIG. 1 and the lower region of the plane of cross-section in FIG. 2. It is apparent that the screening plates 18, 20 are arranged with respect to the coils 14, 16 such that the respective irradiated angular regions 22, 24 have a very small overlap. In the model in which the lamp 10 is regarded as a point light source in the center of a sphere, the surface area of the region illuminated by both coils 14, 16 represents only a very small portion of the total surface area of the inside of the sphere. Two much larger angular regions, which are equally large here because of the symmetrical arrangement, are each illuminated only by one of the coils 14, 16. The axial overlap regions shown in FIG. 1 for the relevant embodiment, moreover, lie in an angular region which is substantially irrelevant for the use of the lamp 10 in a reflector. The hatched radial overlap regions 27, 29 shown in FIG. 2 are approximately 15° wide, so that an overlap only occurs in a region of less than 10% of the total region.

Figure 2:
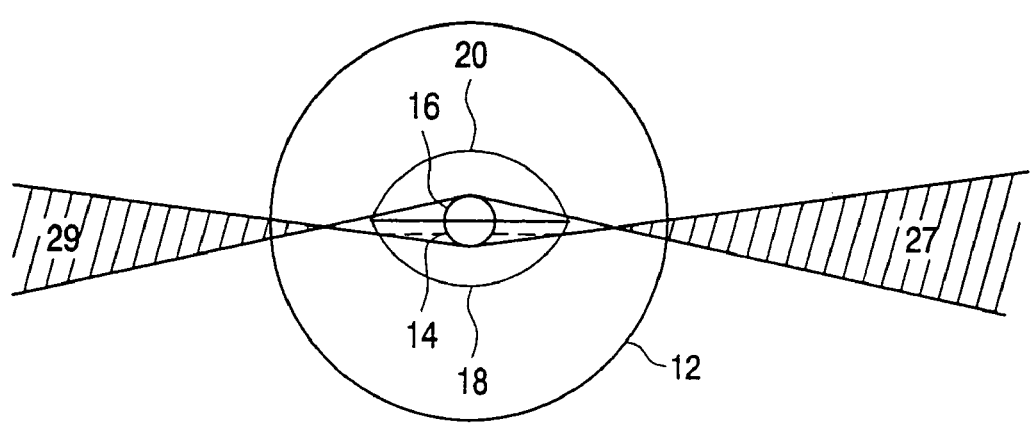
FIG. 2 is an elevation of the front end of the lamp of FIG. 1.

It should be noted in this connection that the pictures shown in FIGS. 1 and 2 are merely symbolic cross-sectional views. The picture emerging in the case of a spatial arrangement of coils 14, 16 and screening plates 18, 20 is obviously much more complicated and impossible to show in a drawing. The interrelationships and ratios visible in a two-dimensional picture, however, may be readily transferred to the construction of a three-dimensional arrangement by those skilled in the art.

Figure 3:
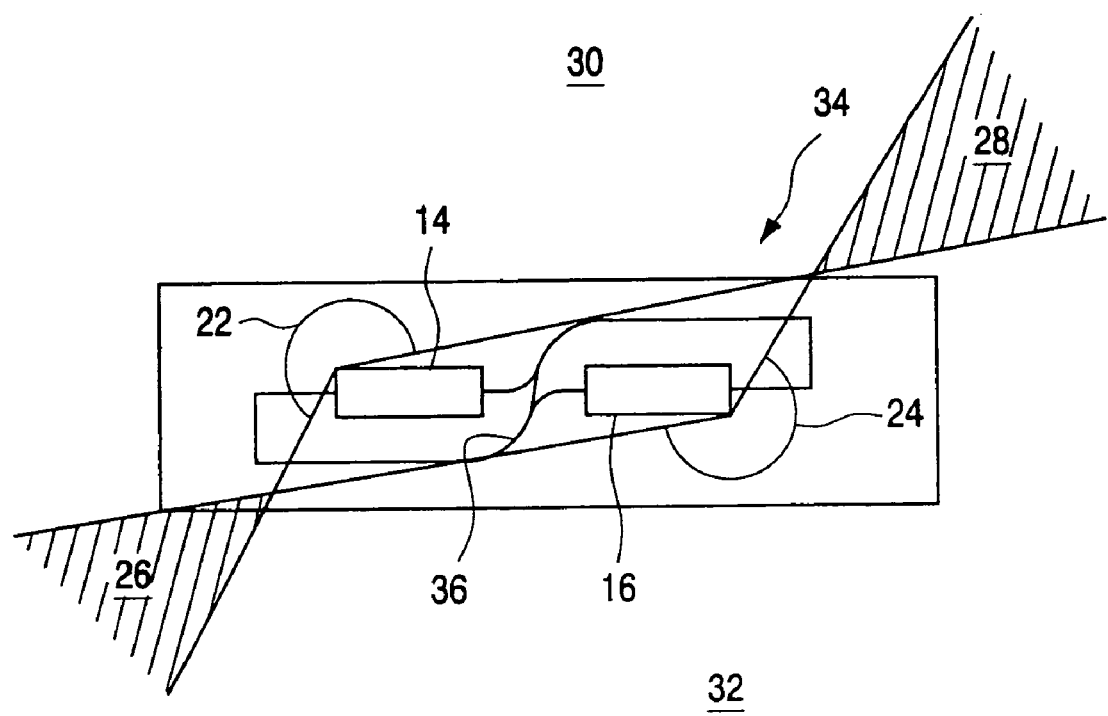
FIG. 3 is a longitudinal sectional view of the glass bulb of a second embodiment of a lamp.

FIG. 3 shows a second embodiment of a dual-filament halogen incandescent lamp. The manner of representation is the same as in FIG. 1, and similar elements have been given the same reference numerals and will accordingly not be explained in detail separately once more.

In the second embodiment of the lamp 34 of FIG. 3, only one screening plate 36 is present instead of two individual screening plates. The screening plate 36 is shaped and positioned such that it screens off both the first coil 14 and the second coil 16, each in its individual angular region. The one screening plate 36 thus fulfills the same function as the two separate plates 18, 20 of FIG. 1. The screening plate 36 is positioned between the coils 14, 16 such that the two coils 14, 16 are present at different sides of the screening plate 36. The screening plate 36, in the longitudinal section of the embodiment as shown, has two mutually opposed curvatures so that it encloses partly both the first coil 14 and the second coil 16. The plate also surrounds the coils at a distance in transverse direction with a cup shape (not shown).

Figure 4:
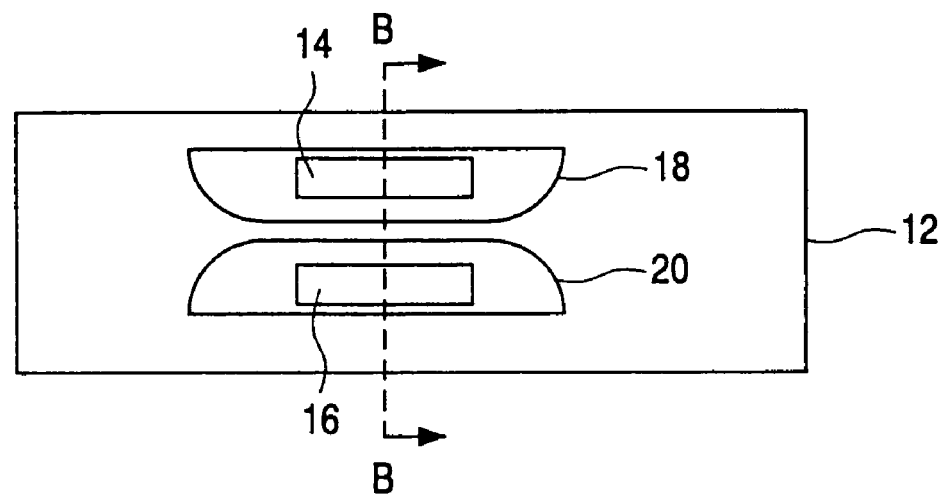
FIG. 4 is a longitudinal sectional view of the glass bulb of a third embodiment of a lamp.

FIG. 4 shows a third embodiment of a lamp. Here, again, the coils 14, 16 are arranged axially, parallel to one another, as in the first and second embodiments. In contrast to the preceding embodiments, the coils 14, 16 are arranged in parallel in longitudinal direction next to one another, not one behind the other.

As in the first embodiment discussed above, each coil 14, 16 is associated with a screening plate 18, 20 which screens off the light of the respective coil over a solid angle region. The screening plates 18, 20 are located between the coils 14, 16, where they are held in position by wires (not shown). The plates 18, 20 may be in contact with one another in the center and may be fastened to one another.

Figure 5:
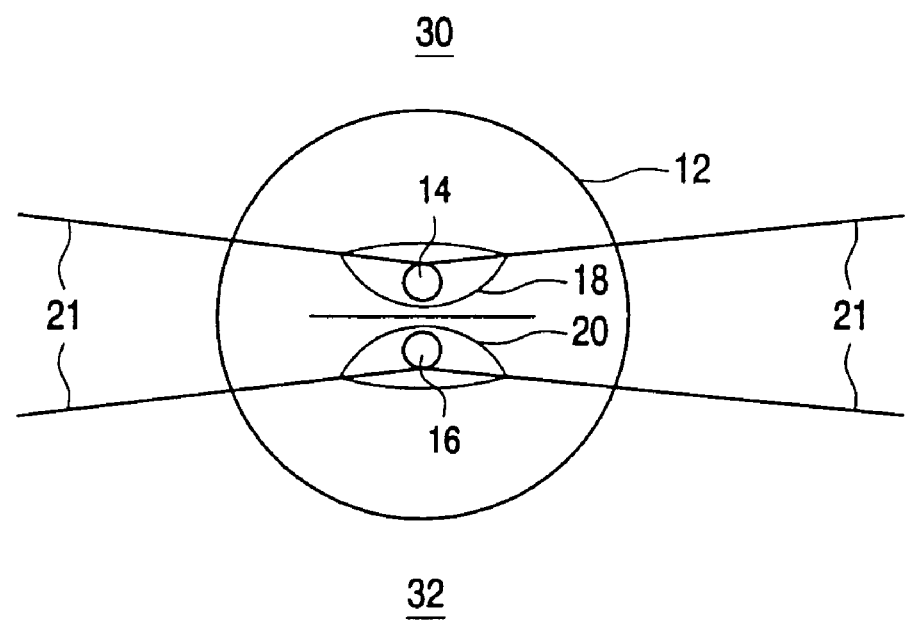
FIG. 5 is a cross-sectional view taken on the line B—B in FIG. 4.

As the sectional view of FIG. 5 shows, the regions (indicated by boundary lines 21) illuminated by the coils 14, 16 do not overlap in this embodiment, i.e. the coils 14, 16 are recessed so deeply in the cups 18, 20 that no overlap occurs either in axial direction (FIG. 4) or in radial direction (FIG. 5).

Figure 6:
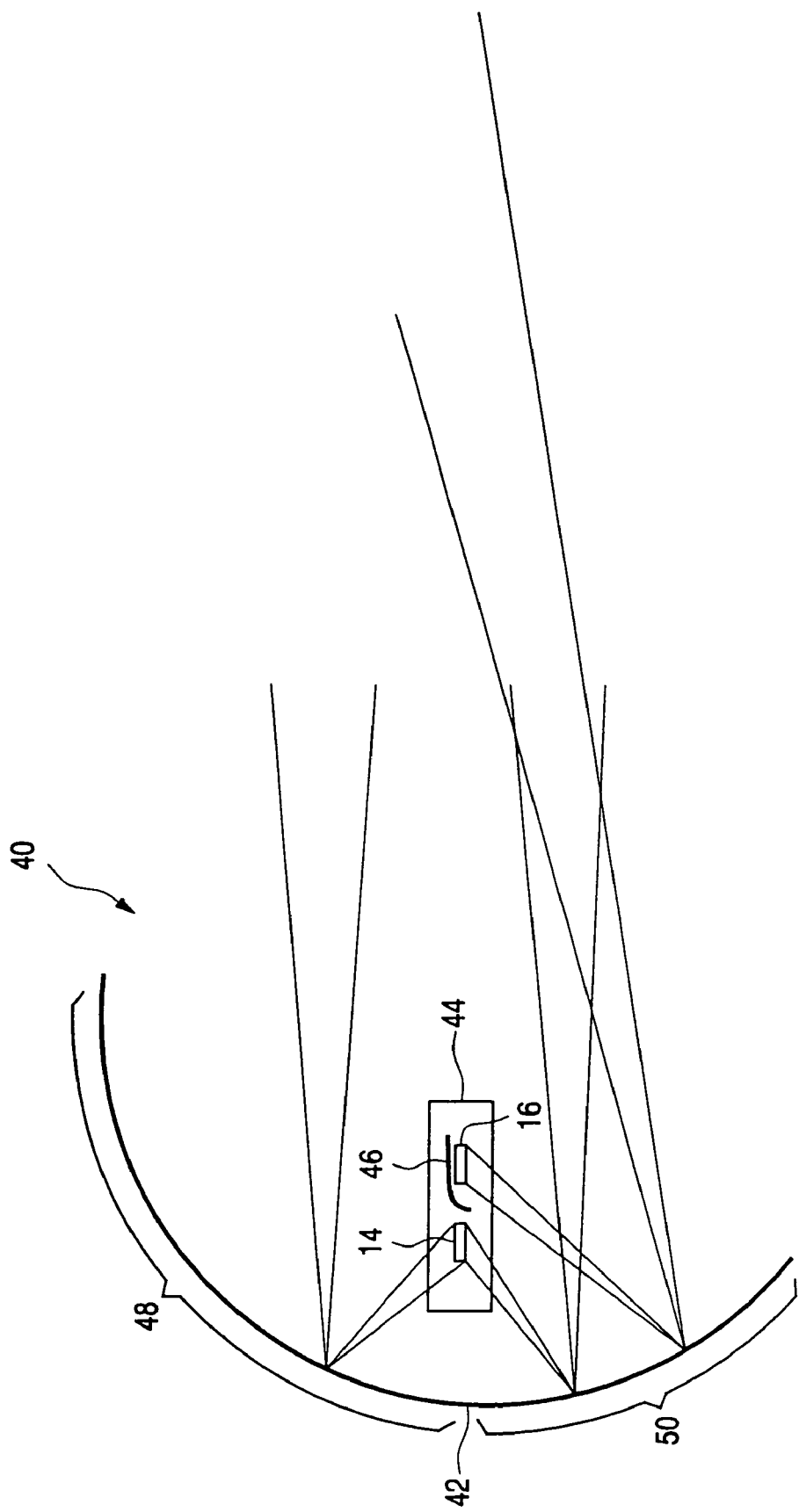
FIG. 6 is a longitudinal sectional view taken on the optical axis of a first embodiment of a headlight formed by a reflector and a lamp arranged therein.

FIG. 6 is a longitudinal sectional view of a headlight 40 with a reflector 42 and a conventional dual-coil incandescent lamp 44, for example a known H4 halogen lamp. The incandescent lamp 44 has a first coil 14, a second coil 16, and a screening plate 46. The reflector 42 is subdivided into two regions 48, 50. The second region 50 of the reflector 42 is associated with the second coil 16. The screening plate 46 screens off the coil 16 partly such that the latter illuminates only the second region 50 of the reflector 42 and not the first region 48 of the reflector 42. The second reflector region 50 is shaped such that, when illuminated by the coil 16, it generates a light beam with a bright/dark cut-off. The bright/dark cut-off is formed here by a suitable imaging of the coil 16 and not by imaging of the edge of the screening plate 46. Design methods for creating the shape of the reflector surface 50 ("complex shape") are known to those skilled in the art.

The first coil 14 has no associated screening plate. It illuminates the entire reflector 42 as a result of this. The upper region 48 of the reflector 42 is so shaped that, when illuminated by the first coil 14, it generates a light beam without a horizontal bright/dark cut-off.

The first coil 14 also illuminates the second region 50 of the reflector. It is ensured as much as possible in the construction of the shape of the surface of the second reflector region 50 that the incoming light is reflected such that it can usefully contribute to the envisaged light beam without bright/dark cut-off, also upon illumination by the first coil 14. This, however, implies a limitation for the construction of the reflector region 50 as regards its cooperation with the coil 16.

Figure 7:
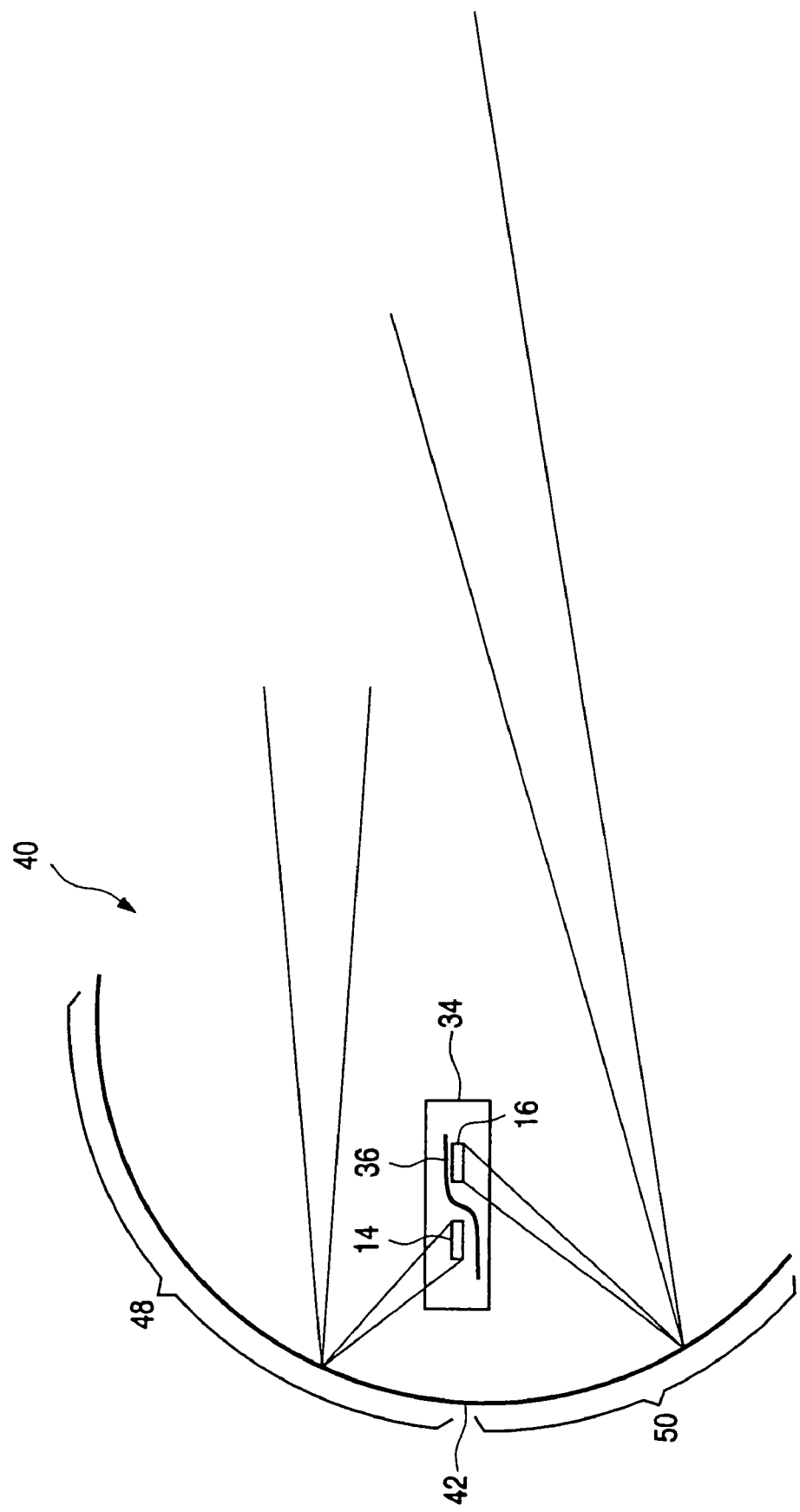
FIG. 7 is a longitudinal sectional view taken on the optical axis of a second embodiment of a headlight, formed by a reflector and a lamp arranged therein.

FIG. 7 shows a second embodiment of a headlight 40. In contrast to the first embodiment shown in FIG. 6, the headlight 40 is fitted with the incandescent lamp 34 of FIG. 3 here. The incandescent lamp 34 comprises the double-action screening plate 36, as explained in detail above, by means of which the first coil 14 and the second coil 16 are each cut off in certain angular regions. This has the result in the headlight 40 of FIG. 7 that the first reflector region 48 is illuminated substantially exclusively by the first coil 14, and the second reflector region 50 is illuminated substantially exclusively by the second coil 16. A small overlap of the regions 48, 50 may arise, as was discussed with reference to FIGS. 1 to 5. It is preferred, however, that no overlap occurs in active regions of the reflector. The first reflector region 48 is designed, as is the second reflector region 50, such that each of the two reflector regions 48, 50 in cooperation with the associated coil 14, 16 generates a light beam which has a horizontal bright/dark cut-off. The relevant bright/dark cut-off is generated here through a suitable superimposition of images of the associated coil 14, 16, for which known design methods are used. This is particularly simple in this case because an illumination by the respective other coil need not be taken into account in the design.

Figure 8:
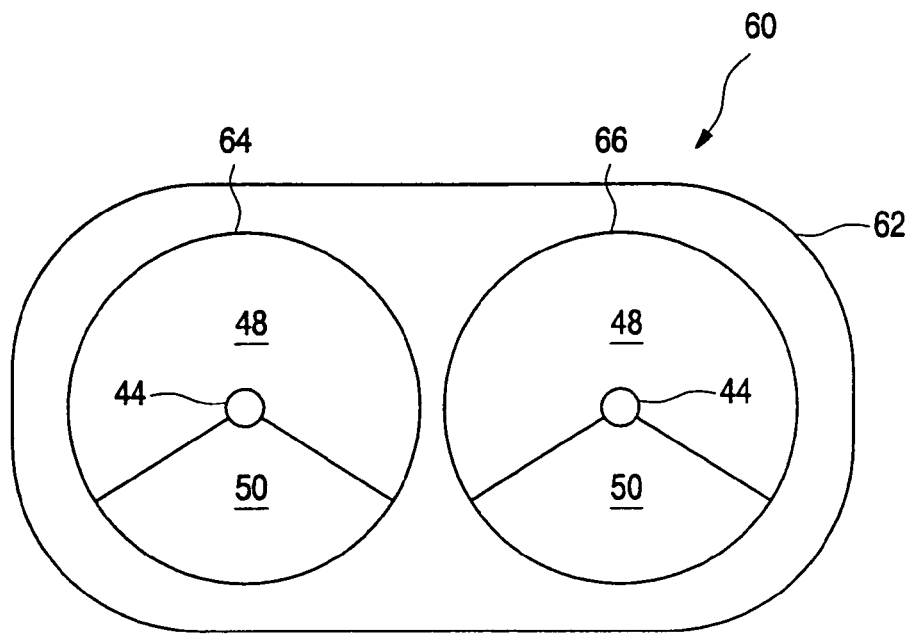
FIG. 8 is a front elevation of a first embodiment of a headlight unit.

FIG. 8 shows a first embodiment of a headlight unit 60 in front elevation. The headlight unit 60 has a housing 62 in whose front surface two headlights 64, 66 are arranged. The two headlights 64, 66 each have a reflector which is subdivided into a first reflector region 48 and a second reflector region 50. Dual-filament incandescent lamps 44 are arranged inside the respective reflectors 64, 66. These lamps are conventional dual-filament incandescent lamps (for example H4) in which the second coil 16 is cut off over an angular region by a screening plate 46, as shown in FIG. 6, so that only the associated surface area of the second reflector region 50 is illuminated thereby. The headlight unit 60 is thus capable of fulfilling four different lighting functions with the two reflectors 64, 66. In this case, one lighting function with and one further lighting function without a horizontal bright/dark cut-off are combined in one reflector 64, 66 each time. A plurality of AFS lighting functions may thus be fulfilled, while the number of reflectors required is kept as small as possible.

One of the lighting functions with bright/dark cut-off (low beam, bad weather beam, city light, highway beam, fog beam, road bend beam, traffic sign beam) is combined with a lighting function without such a cut-off (high beam, daylight driving beam, position light) in each headlight. The lighting function without bright/dark cut-off is assigned to the non-screened coil, the lighting function with bright/dark cut-off to the screened coil.

For example, such a headlight unit with two headlights could be built up as follows:

Headlight 1:
   screened coil: low beam
   on-screened coil: daylight driving beam Headlight 2:
   screened coil: fog beam
   non-screened coil: high beam It is alternatively possible within a headlight unit to realize a lighting function in parallel in several headlights, for example for achieving higher intensities. If we apply this to the high beam, a second example may be as follows:

Headlight 1:
   screened coil: low beam
   non-screened coil: high beam

Headlight 2:
   screened coil: fog beam
   non-screened coil: high beam

Thus, the high beam is realized in this second example in that the non-screened coils are operated in both headlights.

In principle, furthermore, the high beam, daylight driving beam, and position light may be realized with the same combination of coil and reflector region, because the light distributions are substantially the same. The strongly differing light intensities may then be achieved through differences in electrical operation, for example different supply voltage levels.

Figure 9:
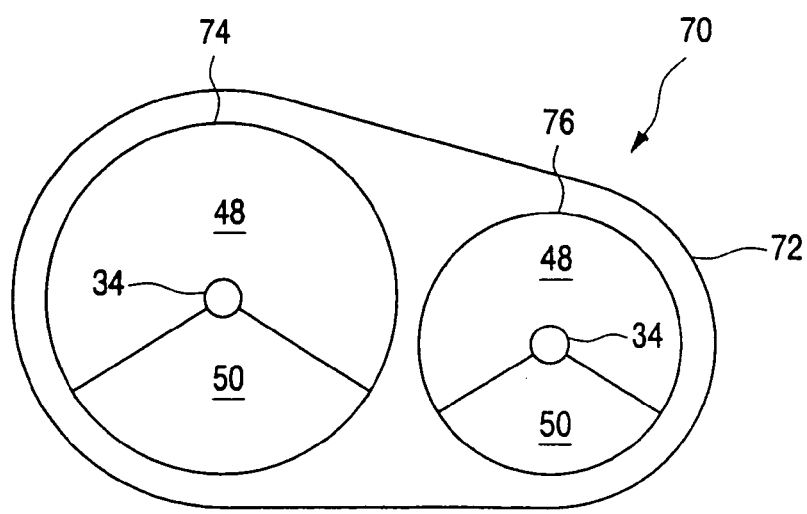
FIG. 9 is a front elevation of a second embodiment of a headlight unit.

The further parameters indicated below are suggested for the individual lighting functions. They relate to, on the one hand, the coil orientation, i.e. the axial or transverse arrangement of the coil relative to the optical axis. Axially oriented coils were shown in the Figures discussed above, but it may prove to be advantageous, depending on the lighting function, to use transversely oriented coils instead. Another parameter is the electrical power rating and the resulting lamp lumens. These are preferred values, but satisfactory values may possibly be achieved also in other ranges:

Coil Orientation
- low beam: axial
- high beam: axial or transverse
- fog beam: axial or transverse
- highway beam: axial
- road bend beam: transverse or axial
- bad weather beam: axial
- daylight driving beam: transverse
- position light: axial or transverse Electrical Power Consumption (Rated Values)
- low beam: 50 W . . . 70 W
- high beam: 65 W . . . 70 W or higher
- fog beam: 30 W . . . 55 W
- highway beam: 50 W . . . 70 W or higher
- road bend beam: 30 W . . . 55 W
- bad weather beam: 50 W . . . 70 W
- daylight driving beam: 10 W . . . 25 W
- position light: 3 W . . . 15 W Lamp Lumens
- low beam: 1000 lm . . . 1100 lm (screened; =approximately 1500 . . . 1650 lm non-screened)
- high beam: 1500 lm . . . 1900 lm
- fog beam: 800 lm . . . 1500 lm (screened;=approximately 1300 . . . 1950 lm non-screened)
- highway beam: 1500 lm . . . 1900 lm
- road bend beam: 1000 lm . . . 1500 lm
- bad weather beam: 1000 lm . . . 1500 lm (screened)
- daylight driving beam: 100 lm . . . 500 lm
- position light: 20 lm . . . 100 lm FIG. 9 shows a second embodiment of a headlight unit 70. This comprises a housing 72 and two reflectors 74, 76, similar to the headlight unit 60 of FIG. 8. By contrast, doubly screened dual-filament incandescent lamps 34 are arranged in the reflectors 74, 76. As was described above, the coils are screened therein in such a manner that the two reflector regions 48, 50 of each reflector 74, 76 are each illuminated by a single associated coil only. The first and second reflector regions 48, 50 of the two reflectors 74, 76 are formed such that, when illuminated by the associated coils, these reflectors generate a light beam with a horizontal bright/dark cut-off.

Four separate lighting functions can thus be realized by the headlight unit 70, wherein each of the four lighting functions has a horizontal bright/dark cut-off.

In a further embodiment (not shown) of a headlight unit, there are two reflectors, one of the reflectors being fitted with a dual-filament incandescent lamp 44, of which only one filament is screened, whereas the other reflector is fitted with a doubly screened dual-filament incandescent lamp 34. This third embodiment of a headlight unit can thus fulfill four lighting functions, three of said lighting functions having a bright/dark cut-off and one lighting function having no bright/dark cut-off.

In summary, the invention relates to a lamp for a motor vehicle headlight, to a headlight for a motor vehicle, and to a headlight unit. According to a first aspect of the invention, a lamp with two coils is proposed which is capable of fulfilling widely differing functions, among them in particular future AFS lighting functions, in a flexible manner, while means for screening off the light emitted by the coils in certain angular regions are arranged such that the regions illuminated by the coils—at least in the radiation directions relevant for the use in a reflector—overlap only slightly, preferably not at all. Such a headlight comprises a reflector with at least two reflector regions which are each illuminated by an associated coil, the first and the second reflector region having a maximum overlap of 20% of the total reflector surface area. In a further embodiment of the invention, the reflector regions are shaped such that one headlight emits two headlight beams, both having a substantially horizontal bright/dark cut-off.

According to a second aspect of the invention, a headlight unit for a motor vehicle comprises at least two reflectors with lamps arranged therein, such that each of the two reflectors is capable of emitting a light beam with and a further light beam without an approximately horizontal bright dark cut-off. In a further embodiment, combinations of AFS lighting functions are realized by the headlight unit according to the invention.

The invention claimed is:

1. A lamp for a motor vehicle headlight with at least two coils (14, 16) which can be controlled independently of one another, said lamp (10) comprising means for screening off (18, 20, 36) the light emitted by the coils (14, 16) in certain angular regions, such that, when a first coil (14) is switched on, a first light beam is radiated in a first region (30), and when a second coil (16) is switched on, a second light beam is radiated in a second region (32), characterized in that the at least two coils (14,16) are arranged axially parallel to one another, and the first region and the second region overlap by no more than 20% of the first region plus the second region at least in those radiation directions which are relevant for the use in a reflector (42).

2. A lamp as claimed in claim 1, wherein
the first and the second region (30, 32) have no overlap at least in those radiation directions which are relevant for the use in a reflector (42).

3. A lamp as claimed in claim 1, wherein
an associated screening body (18, 20) is provided for each of the coils (14, 16).

4. A lamp as claimed in claim 1, characterized by a screening body (36) which is positioned between the coils (14, 16).

5. A headlight for a motor vehicle with
a reflector (42)
and at least one lamp (10, 34) located inside the reflector (42) with at least two coils (14, 16)as claimed in claim 1,
which reflector (42) is subdivided into at least two regions (48, 50) for generating distinct headlight beams,
a first reflector region (48) being illuminated by the first coil (14), and
a second reflector region (50) being illuminated by the second coil (16), characterized in that
the first and the second reflector region (48, 50) have at most an overlap of 20% of the total reflector surface area.

6. A headlight as claimed in claim 5, wherein
the first reflector region (48) is shaped such that, when illuminated by the first coil (14), it generates a first headlight beam,
said first headlight beam has a substantially horizontal bright/dark cut-off, and
the second reflector region (50) is shaped such that, when illuminated by the second coil (16), it generates a second headlight beam,
said second headlight beam also having a substantially horizontal bright/dark cut-off.

7. A headlight unit for a motor vehicle,
with at least two headlights (74, 76),
wherein each of the headlights is constructed in accordance with claim 5.

8. A headlight unit for a motor vehicle,
with at least two reflectors (64, 66; 74, 76) and lamps (34, 44) arranged in said reflectors,
each of said lamps (34, 44) having at least two coils (14, 16), the at least two coils (14, 16) arranged axially parallel to one another,
and each of said reflectors (64, 66; 74, 76) being subdivided into at least two regions (48, 50), wherein a first upper region (48) is associated with a first rearward coil (14) and a second lower region (50) is associated with a second forward coil (16) each time, a screening plate (46) being associated with at least the second forward coil (16) such that the second forward coil (16) is cut off over an angular region by the screening plate (46), so that substantially only the associated surface area of the second lower reflector region (50) is illuminated thereby,
whereby each of the two reflectors (64, 66) is constructed such that it radiates a first light beam having an approximately horizontal bright/dark cut-off,
and a second light beam having no horizontal bright/dark cut-off.

9. A headlight unit as claimed in claim 8, wherein the radiated light beam with an approximately horizontal bright/dark cut-off is a low beam, bad weather beam, highway beam, road bend beam, traffic sign beam, or fog beam,
and the radiated light beam without horizontal bright/dark cut-off is a high beam, daylight driving beam, or position light.

10. A headlight unit as claimed in claim 8, wherein a screening plate (36) is associated with both the first rearward coil (14) and the second forward coil (16) such that the first rearward coil (16) is cut off over an angular region by the screening plate (36), so that substantially only the associated surface area of the first upper reflector region (48) is illuminated thereby, and the second forward coil (16) is cut off over an angular region by the screening plate (36), so that substantially only the associated surface area of the second lower reflector region (50) is illuminated thereby,
whereby each of the two reflectors (64, 66) is constructed such that it radiates a first light beam having an approximately horizontal bright/dark cut-off,
and a second light beam having no horizontal bright/dark cut-off.

11. A headlight unit as claimed in claim 10, wherein the radiated light beam with an approximately horizontal bright/dark cut-off is a low beam, bad weather beam, highway beam, road bend beam, traffic sign beam, or fog beam,
and the radiated light beam without horizontal bright/dark cut-off is a high beam, daylight driving beam, or position light.

* * * * *